(12) United States Patent
Bloom

(10) Patent No.: US 8,095,410 B2
(45) Date of Patent: Jan. 10, 2012

(54) PASS THROUGH FOR IMPROVED RESPONSE TIME

(75) Inventor: Andrew M. Bloom, Broomfield, CO (US)

(73) Assignee: Motorola Solutions, Inc., Schaumburg, IL (US)

( * ) Notice: Subject to any disclaimer, the term of this patent is extended or adjusted under 35 U.S.C. 154(b) by 422 days.

(21) Appl. No.: 12/338,555

(22) Filed: Dec. 18, 2008

(65) Prior Publication Data
US 2010/0161370 A1    Jun. 24, 2010

(51) Int. Cl.
*G06Q 10/00* (2006.01)
(52) U.S. Cl. ....... 705/7.22; 705/7.25; 705/324; 705/323
(58) Field of Classification Search .................. 705/7.22, 705/7.25, 323, 324
See application file for complete search history.

(56) References Cited

U.S. PATENT DOCUMENTS

| | | | |
|---|---|---|---|
| 5,043,736 A | 8/1991 | Darnell | |
| 5,334,986 A | 8/1994 | Fernhout | |
| 5,483,455 A | 1/1996 | Lay | |
| 5,559,707 A | 9/1996 | DeLorme | |
| 5,587,715 A | 12/1996 | Lewis | |
| 5,802,492 A | 9/1998 | DeLorme | |
| 5,862,244 A * | 1/1999 | Kleiner et al. | 382/104 |
| 6,128,571 A | 10/2000 | Ito | |
| 6,216,086 B1 * | 4/2001 | Seymour et al. | 701/202 |
| 6,298,306 B1 | 10/2001 | Suarez | |
| 6,331,825 B1 | 12/2001 | Ladner | |
| 6,606,557 B2 * | 8/2003 | Kotzin | 701/209 |
| 6,792,351 B2 * | 9/2004 | Lutter | 701/210 |
| 6,862,524 B1 * | 3/2005 | Nagda et al. | 701/209 |
| 7,174,153 B2 * | 2/2007 | Ehlers | 455/404.2 |
| 7,177,397 B2 | 2/2007 | McCalmont | |
| 7,245,215 B2 | 7/2007 | Gollu | |
| 7,271,736 B2 * | 9/2007 | Siegel et al. | 340/902 |
| 7,395,151 B2 * | 7/2008 | O'Neill et al. | 701/209 |
| 2002/0057204 A1 * | 5/2002 | Bligh | 340/691.1 |
| 2005/0164673 A1 * | 7/2005 | Ehlers | 455/404.1 |
| 2006/0167728 A1 | 7/2006 | Siegel | |
| 2008/0046134 A1 | 2/2008 | Bruce | |
| 2008/0215202 A1 * | 9/2008 | Breed | 701/25 |

OTHER PUBLICATIONS

Field service system goes real-time. Anonymous. Fleet Ownder, v102 n9, pp. 66 Sep. 2007.*

(Continued)

*Primary Examiner* — Johnna Loftis
(74) *Attorney, Agent, or Firm* — Anthony P. Curtis; Daniel R. Bestor

(57) ABSTRACT

Method and systems of improving the response of public safety personnel to or evacuation from a desired location are provided. In addition to path information obtained through traditional sources, information is used to determine the optimal route for emergency personnel to an emergency situation and for aiding emergency personnel to route people from the situation. The information may also be used to automatically prioritize vehicles and personnel to optimize response time. Further, the information may also be used to in situations in which it is advantageous for the vehicle or personnel to be tactically positioned in nearby locations rather than at the incident scene. Although the descriptions below will primarily focus on routes to a particular location, similar methods can be used for evacuations from the location. The optimal route may use historical information stored in a database local or remote to the dispatcher and/or real-time information updated during the emergency situation.

20 Claims, 12 Drawing Sheets

OTHER PUBLICATIONS

Cassidy, John. Deployable GIS at the ready for first responders: deployable GIS and a range of ancillary technologies, such as digital maps, live video, voice and text feeds, and the hardware and solutions to power them, stand at the ready for first responders. but a first responders ready to use them? GEO World, 21, 10, 22(4). Oct. 2008.*

Intrado Announces Agreements with Leading Location Determination Vendors; Agreements Highlight Growing Importance of Mobility in VoIP E9-1-1 Delivery. Business Wire. Feb. 23, 2006.*

* cited by examiner

PASS THROUGH FOR IMPROVED RESPONSE TIME

TECHNICAL FIELD

The present application relates to improved response time. More specifically, the application relates to improved response time to or from an event based on collocated information.

BACKGROUND

With the advent of an information-based society and the explosion of internet users, the information available to the ordinary individual has increased dramatically over the last decade. Online maps are commonly used to find particular locations, as well as to determine the route with the shortest distance to a location. Some sites use additional information such as the posted speed limit to provide the route taking the least amount of time for the vehicle to traverse. However, this latter information may be of little value to public service providers (e.g., ambulance, fire, police) when a fast response is desired as their vehicles are able to ignore the speed limits.

Public service response vehicles and personnel are in fact usually dispatched to locations where their presence is urgently needed by a dispatcher (i.e., person at a central location); and in such situations response time is often critical. In such situations, the dispatcher (or individual in the public service vehicle) typically uses one or more sources of information to select the most effective set of roads for the vehicle or personnel to travel. This information mirrors that available online, e.g., the route having the shortest distance to traverse, and thus, presumably the fastest route for the vehicle. However, the information used to determine the shortest vehicular distance often lacks information that can be used to make a better decision and thus enable the vehicle or personnel to arrive at the desired destination sooner.

Moreover, in certain situations, such as crime scenes in which the criminal activity is ongoing, it may not be desirable for the public service vehicle to arrive at the destination indicated by the dispatcher. In these situations, it may instead be desirable for the vehicle to arrive in a nearby location. There is, at present, no mechanism exists in such situations for determining better positioning.

BRIEF DESCRIPTION OF THE DRAWINGS

Embodiments will now be described by way of example with reference to the accompanying drawings, in which.

DETAILED DESCRIPTION

Figure 1:
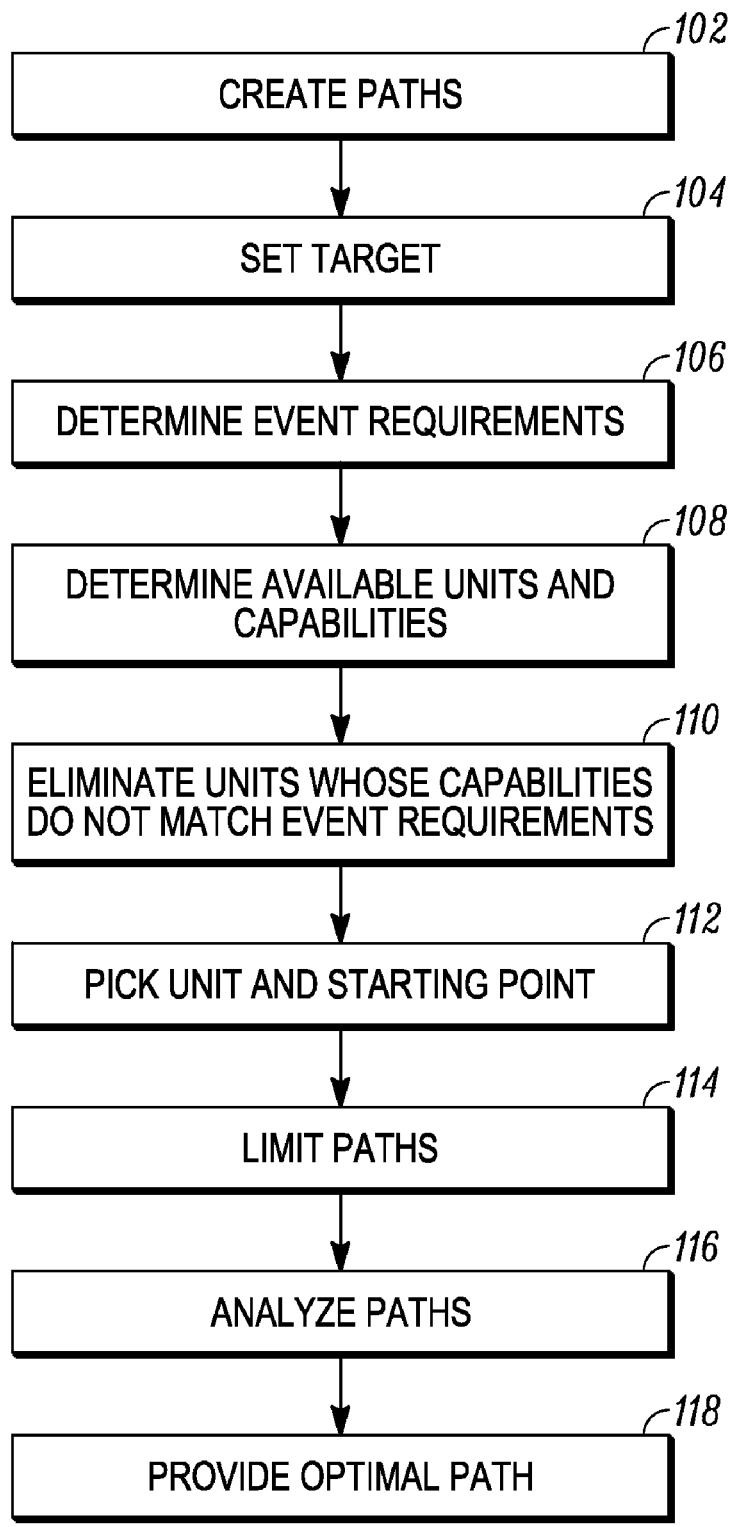
FIG. 1 is an embodiment of one method for determining an optimal route.

Methods of improving the response of public safety personnel to or evacuation from a desired location (target) are provided. Additional information is used to determine the optimal route for emergency personnel to an emergency situation and for aiding emergency personnel to route people from the situation. The information may also be used to automatically prioritize units and personnel to optimize response time. Further, the information may also be used in situations in which it is advantageous for the vehicle or personnel to be tactically positioned in nearby locations rather than at the incident scene. Although the descriptions below will primarily focus on routes to a particular location, similar methods can be used for evacuations from the location. The optimal route may use historical information stored in a database local or remote to the dispatcher and/or real-time information updated during the emergency situation.

As described above, in emergency situations a dispatcher selects public service personnel and a corresponding vehicle, if present, and provides the personnel with a destination (also referred to as a target) where their service is needed. The location of the dispatcher is dependent on the particular public service provider if a call is placed directly to that provider. The dispatcher can also be a central dispatcher, such as a 911 emergency operator who contacts a number of different public service providers. In either case, in addition to receiving the call, the dispatcher may provide route information to the personnel verbally or by downloading the information into a portable device carried by the personnel. Alternatively, once the destination has been supplied by the dispatcher, the route information can be obtained manually by the personnel using the portable device. This route information can then be visually conveyed on a display of the portable device, audibly conveyed, or printed out using a printer proximate to the portable device.

To begin, many emergency scenes are accessible by cars, trucks, or other vehicles. The use of known roadways to determine the optimum path to a destination is known for commercial users under certain conditions. However, such calculations lack information that can be used to provide a route with potentially crucial time savings. For example, in both urban and rural settings, alternate paths usually exist to any particular destination. These alternate paths may be official (e.g., unmapped roadways) or unofficial. In urban or rural areas such paths may include, for example, alleys, parking lots, vacant areas (unpaved or paved), or footpaths through buildings. In rural areas, the paths may further include trails (e.g., hiking or biking trails) or unofficial byways (e.g., unmarked dirt roads). Such paths may provide shortcuts between known roads. Knowledge of these paths may also permit a reduction in time even if the overall route using these paths is somewhat longer physically than shorter routes due to congestion or blockages along the more direct routes. For example, it may be beneficial for an ambulance to go through a parking lot to reach a side street and have to go a block or two out of the way if the main street the ambulance would otherwise travel is blocked by traffic.

The knowledge of alternate paths is not limited to automotive paths that can only be traversed by automotive vehicles such as cars, ambulances, or fire trucks. For example, especially in urban settings, police use alternate vehicles such as motorcycles or bicycles that can also use pedestrian paths, and helicopters. In addition, public service personnel may also not be using vehicles but may instead be on foot. Even if initially being in a vehicle, however, it may be more expeditious to reach the destination on foot (e.g., it may be faster to run across a lot than to drive to the scene). Further, in many situations, the ultimate destination is a building or a particular area in the building that is only accessible via foot. Pedestrian paths as used herein refer to paths that are accessible by foot and may, in certain circumstances (such as narrow alleys), be traversed by the above alternate vehicles. Thus, the various times may include automotive vehicular times obtained using automotive vehicles, alternative vehicular times using alternative vehicles, and pedestrian times using foot speed (which may be modified dependent on, e.g., the equipment carried).

Optimization of response time should take into account all of the various paths to reach the ultimate destination, but may be limited by the requirements of the event at the target and the capabilities of the unit (hereinafter referring to the responder—vehicle or personnel) and throughways used to reach the destination. Thus, traditional map data such as known roads and traffic/news reports is coupled with non-traditional map data. The non-traditional map data includes the alternate routes determined from the most recent versions of public records such as satellite images, plat/topological maps, construction specifications, architectural layouts of buildings, etc. Other non-traditional map data that may beneficial include potential paths such as sewers, water access/crossing (ocean/inter-coastal/river/canal), third-party transport paths such as subways, ditches, and alleys. For example, water ways may be beneficial for emergency responders with specialized equipment such as boats or scuba equipment. Constraints added to these paths include street limitations (e.g., size, number of lanes, one way), legal rights to traverse the property, and terrain issues. For example, if a street is one way, it may be accessible by foot, but a vehicle may not be able to readily traverse it in the desired direction, the width/height of an alley may be an issue as it is too thin for EMS to push a gurney through, and an open lot clear cut may be easier to run through than an open lot containing high weeds, debris, or sizable hazards.

While such information may be available through various means, it is presently not used in this manner. State and local agencies, for example, use Geographical Information System (GIS) databases to manage, plan, and record geographical information in their jurisdictions. The placement of roads, sewers, and other municipal information that are used for planning and management purposes are kept in GIS databases. However, these GIS databases are used only to map these geographical data points for realty purposes, e.g., to know where a public road ends and a private road begins, to know where a sewer line is for purposes of repair, etc. Each municipality typically updates these databases as repairs are undertaken and completed.

Although the additional information may be available electronically or in other formats, it further may be difficult or impossible to coordinate on-the-fly. Moreover, while the above municipalities also operate safety departments such as police, fire, and paramedic services, these departments are not provided access to the GIS databases for the associated municipality. Thus, as above, the departments are unaware of changes in the database that may affect their operations or assist in managing the operations they control. For example, paramedics may be unaware that a given street is closed for repairs, and be delayed in responding to a call because the paramedics en route to an accident scene tried to use the street that is closed. In addition, GIS databases are often unaware of other information that could be used to optimize routing, such as construction specifications showing, e.g., the locations of fences around an otherwise vacant lot, news reports indicating activities such as parade routes and times, and building layouts.

Present systems thus do not take into account dynamically changing traffic situations. At best they merely report a status, and are not integrated with a GIS system for use in planning purposes. Many mapping databases report that there is an accident on a given freeway, but do not determine any time of travel on the road, segment, or interval containing the accident. Further, these routing systems are generically determined based on only one data input, namely, a road closure. These systems do not take into account other factors such as equipment status or time of travel between two given points on the roads, segments, alleys, etc. that connect these two points. These systems also do not retain data for analysis after events have occurred to root out systemic problems or determine corrective actions.

Even if the GIS databases were combined with existing services, the number of sensors and other data sources used to augment the GIS databases do not provide proper coverage to accurately predict or determine the optimal route between two points. Even in large metropolitan areas, the percentage of roads monitored by sensors is a small fraction of the number of roads that are in service, and, as such, the data available cannot provide an accurate model of real-time traffic conditions.

Typical reasons for optimizing response or evacuation routes include events such as natural disasters (e.g., hurricane, wildfire, avalanche, famine, drought, fire, hail, mud slide, rock slide, floods, tsunami, changes in water table, changes in weather conditions), weather conditions (e.g., snow, sleet, high wind), traffic problems (e.g., stop lights broken, icy roads), crimes (e.g., burglary, vehicular accident, traffic violation, disturbing the peace, public disturbance, domestic disturbance), medical situations (e.g., epidemic, heart attack, choking, stroke), power problems (e.g., electrical/gas outage, power lines down), or other life or property endangerments (e.g., evacuation, rescue search, hazardous material leakage, protection of personnel (such as the president), terrorist attack). The non-traditional map data used as factors other than mere proximity to be taken into consideration in optimizing the route includes map data (e.g., plat maps, architectural drawings), terrain information (e.g., flat, hilly, rocky), outdoor areas (e.g., sidewalks, alleys, bike paths, canals, commercial lots, farmland, private areas (roads, land, yards), water access or crossings, roof-top to roof-top, ski and slide areas (runs, lifts), railways, third-party transport paths, trails, vacant areas), underground areas (pipelines, drain pipes, sewers, tunnels, subways), and indoor areas (air-condition conduits, attics, balconies, crawl spaces, electrical conduits, elevators, escalators, footpaths through buildings, heating conduits, staircases, sub-floors, window wells, windows). At least some of these scenarios have fixed evacuation routes, and use the same evacuation routes for all types of emergencies. Emergency operations centers also do not have access to the tools to dynamically identify the optimal routes for evacuation. As such, there are typically signs marking predetermined roadways as "evacuation routes" rather than dynamic determinations of what route may be best at any given time or for any given emergency. However, these incidents are dynamic in nature, leading to the inability to predict an optimal evacuation plan due to uncertainties in how the emergency will unfold prior to the actual event.

Interconnection of various sources of data thus permits determination of optimized routes to (emergency response) and from (evacuation) the target using the above-described traditional and non-traditional map data. To accomplish this, computer software such as Premier Computer-Aided Design (PCAD) may be used to provide and update information that is used to optimize routes. Use of such programs allows compatibility with prior versions of the same data when information is to be updated or new information is to be added. Users can add an additional geofile layer to an already-existing set of geofile layers to include various thoroughfares. Information may be entered into the system in any number of known techniques, e.g., using manual entry, scanning in architectural plans and using computer recognition, etc. . . . .

The various method of data entry are conditioned upon diverse factions including but not limited to the format in the data is available (such as hand drawn, directly compatible digital formats or conversion from alternate sources of digital data), the associated cost(s) of data entry, and the determined importance and/or value of the extent of the data to be utilized. Factors such as the availability to purchase data from third parties sources vs. the cost of entry by the agency may also be used. Another factor may be the acceptability of utilizing a multiplicity of data formats to facilitate data entry and reduce the related costs. One example of this is using existent digital street information already stored in the dispatcher's system, with analog images of buildings scanned and stored as records linked to target sites. In this case, the dispatcher might be provided which a number of choices of units based on the location of the building at which an event is occurring, and the final determination of which unit(s) would then be dispatched might be predicated on the dispatcher viewing the respective digitized image. Also the extent of the data required (such as are sewer paths), the costs of training dispatchers to utilize additional data effectively, the desired order of data collection may be considered. Other factors determined by a given agency may be used. Such factors include the extent a given embodiment is already developed or the costs of purchase or development of modules for specific data types by an agency or a product development company. An additional consideration might include the costs of transferring from one product to another.

FIG. 1 illustrates one embodiment of a general process of optimizing a particular route. Paths between different locations are first created 102 using known algorithms. The information used includes various geofiles so that path characteristics and limitations are incorporated in the description of the path for later application. This will be described in more detail below. A target is established 104, thereby setting the end point of the path. The event requirements are determined 106, as are the available units and their capacities 108. Those units whose capacities do not match with the event requirements are eliminated 110. A unit, and thus origin or starting point of the path, is selected 112. The set of paths that begin at the origin and end at the target are limited based on distance, time, and/or other elements 114. The limited set of paths is then analyzed 116 and the optimal path determined and provided to the user 118. Although not shown, an initial limitation based on distance, for example, may be undertaken after the paths are created and prior to the occurrence of any event.

Figure 2:
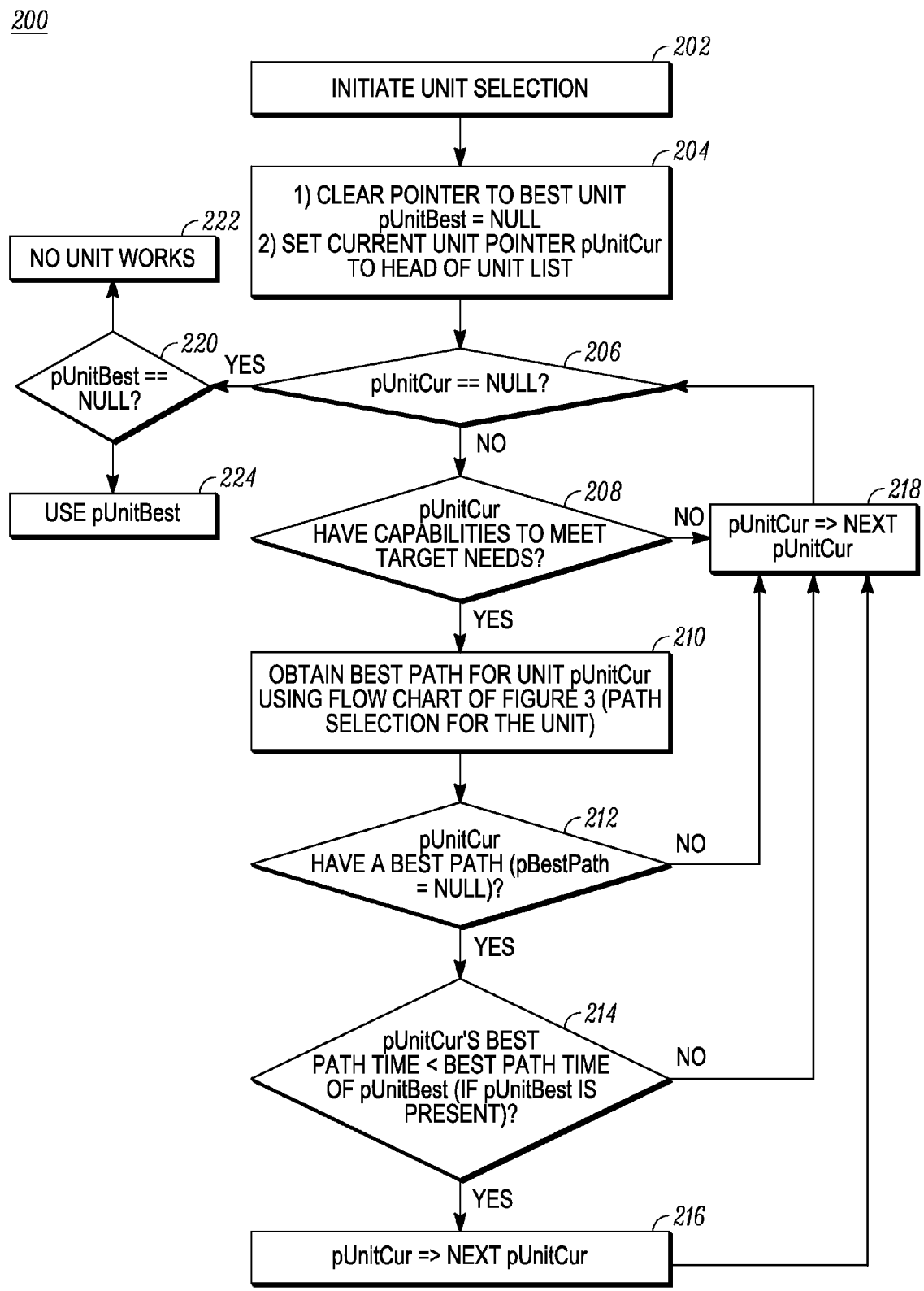
FIG. 2 is an embodiment of a flowchart for selection of the best unit.

One manner in which a particular unit to a target is selected is shown in the flowchart 200 of FIG. 2. This flowchart 200 assumes that the units are all stored as linked lists, each list either being populated with the particular data of the list or being null (i.e., not having any elements). Other implementations, such as arrays or hash tables, can be used instead of lists. After initiation of the selection process (202), a pointer to the best unit (pUnitBest) is cleared and the current pointer (pUnitCur) is set to the head of the unit list (204). If the current pointer points to a unit (206), it is determined whether the unit has the capabilities to meet the needs for the target (208). This is to say that the unit list may contain different types of units (e.g., police, fire, ambulance) and/or the same type of units with different equipment or personnel. The needs of the target are determined and matched up with the capabilities of the various units in the unit list. If the unit has the capabilities to meet the needs for the target, the process continues by obtaining the best path for the current unit (210) using the flow chart 300 of FIG. 3.

Figure 3:
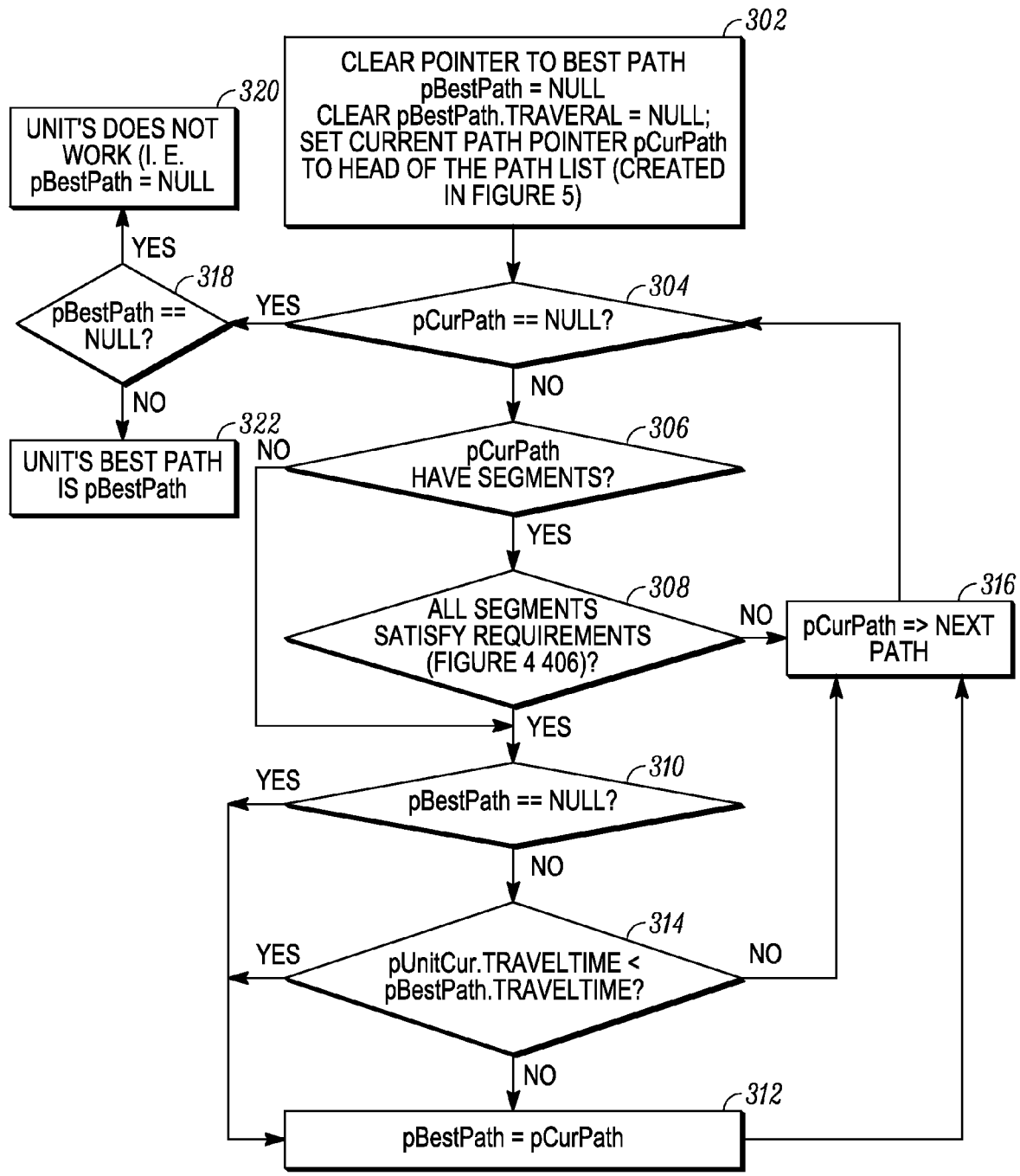
FIG. 3 is an embodiment of a flowchart for selection of the best path for a particular unit.

After completing the process in FIG. 3, the process in FIG. 2 continues by determining whether a best path exists for the current unit (212). If the current unit has a best path, and if a best unit (i.e., a unit that has the shortest path time) has been previously determined, it is determined whether the best path time of the current unit is less than the best path time of the previously-determined best unit (214). If the best path time of the current unit is less than the best path time of the previously-determined best unit (214), then the process replaces the previously-determined best unit with the current unit as the best unit (216). If the current unit does not have the capabilities to meet the demands of the target (208), the current unit does not have a best path (212), or the best path time of the current unit is at least that of the best path time of the previously-determined best unit (214), then the next unit is selected as the current unit (218) and the process again determines if the current unit (i.e., the next unit in the list) is present (204). Similarly, once the process replaces the previously-determined best unit with the current unit as the best unit (216) then the process again selects the next unit as the current unit (218). If the last unit has been reached (204) (i.e., the next unit in the list is not present either because no units are present in the list or the last unit before incrementing has been reached), it is determined whether a best unit exists (220). If a best unit does not exist, the fact that no available unit (222) is relayed to the user while if a best unit exists, the best unit selected is relayed to the user (224).

Turning to the flowchart 300 of FIG. 3, to find the best path for the current unit, a list of possible paths for the current unit is accessed. Again, although the process is described in terms of a list, other implementations are possible. Once the list is accessed, the pointer to the best path (pBestPath) is cleared, as is the best path time (pBestPath.TraversalTime), and the current path pointer (pCurPath) is set to the first element (head) of the path list (302). It is then determined whether this first element (the current path) is empty (304). In this instance, if the current path is empty, there are no paths—the unit is too far away, unavailable, etc. . . . . If the current path is not empty, it is determined whether the path has any segments (306). If the current path has segments, it is determined whether all of the segments are able to satisfy the event requirements (308) as shown in the process flowchart 400 of FIG. 4. As described in more detail below, in this step (308) it is determined for each segment whether the unit is able to travel using that segment and still maintain the equipment necessary to respond.

If the current path is able to satisfy the event requirements, whether or not the current path has segments, it is then determined whether a best path has previously been determined (310). If a best path has not been determined, then the current path [306] is set to the best path and the best path time (pBestPath.TraversalTime) is set to the current path time (pCurPath.TraveralTime) (312). If a best path has been determined, then the current path time is compared to the best path time (314). If the current path time is less than the best path time, then again the current path is set as the best path and the best path time is set to the current path time (312). If at least one of the segments makes it impossible to satisfy the event requirements (308) or the current path time is not less than the best path time, as well as after the current path has been set to the best path and the best path time is set to the current path time, the next path in the list is selected as the current path (316). The process now returns to step 304, where it is again determined whether any other paths exist (as shown, whether the current path is null). Once all of the paths for the current unit have been processed, it is determined whether a best path has been selected (318). In other words, it is determined whether any paths exist for the current unit and whether any of these paths are able to satisfy the event requirements. If no paths exist for the current unit or none of the paths are able to satisfy the event requirements, the current unit does not work (320) and the null best path is provided (322) when the process returns to step 210 in FIG. 2. If at least one of the paths is able to satisfy the event requirements, the current unit is able to be used and the best path set at step 210 is provided (322) when the process returns to step 210 in FIG. 2.

Figure 4:
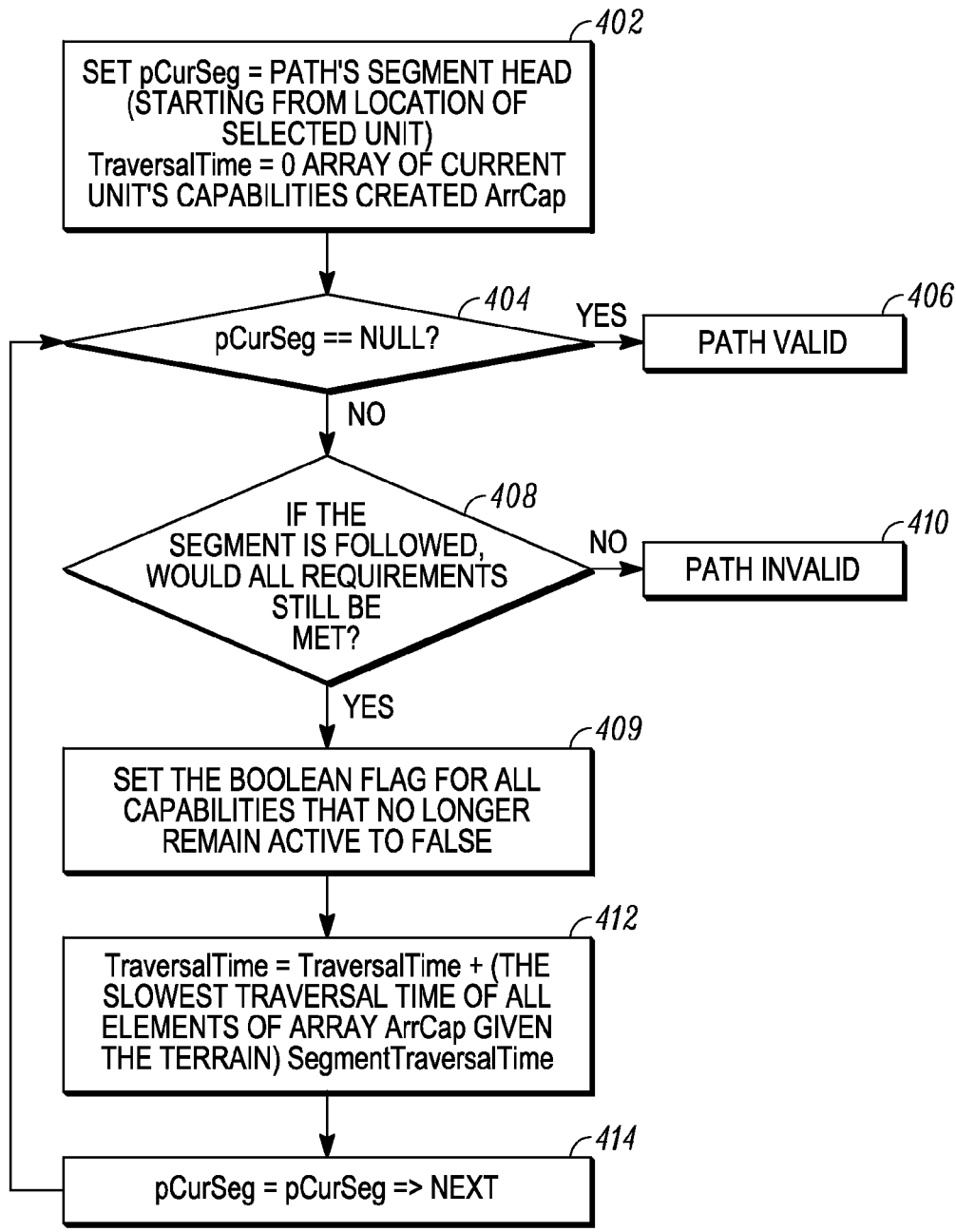
FIG. 4 is an embodiment of a flowchart for validation of a path with multiple segments.

FIG. 4 is one embodiment of a flowchart 400 for path valuation. As shown in step 208 of FIG. 2, prior to starting path validation the capabilities of the unit have been checked against the requirements of the event and were found to at least meet the requirements. To provide valuation of the current path, the current segment (pCurSeg) is set to the head of the path's segment list (302). The head of the path is the location of the current unit. In addition, the estimated time it will take the current unit to travel the path (TraversalTime) is set to 0 (302). Also, an array of all the capabilities (ArrCap) of the current unit is created (402)

Each element of the array holds at least two fields, which include a Boolean flag indicating the validity of each element (which represents a capability of the element such as an officer carrying a gun, the presence of a K9, etc.). As traversal of the segments occurs, the array is checked for the required capabilities. Should the required capabilities no longer be present, the path is marked as not valid (410).

It is then determined whether the current segment is null (404). For the current segment to be null, the current unit is located at the target site (either initially or when all of the segments have been followed). In some embodiments, this may be the ultimate destination (e.g., the particular room in a building), while in other embodiments, only the general location (e.g., the building) is taken into account. If the current segment is null, it is determined that the path is valid (406). After determining that a current segment exists, it is determined whether all of the requirements of the event would still be met if the segment is followed (408). When traversing a segment, each capability of the current unit is checked to see if it remains able to satisfy the event requirements. If one of the capabilities is unable to satisfy the event requirements after or during travel through the segment, it is determined that the segment cannot satisfy the requirements of the event (e.g., the event requires equipment unable to be transported through the segment or the current unit is physically unable to traverse the segment) and thus that the path is invalid (410). If the path is determined to be invalid at step 410, this result is returned to step 308 in FIG. 3, and, as described a new path is selected 408.

Should there be a hindrance of any sort along a particular segment, then it is determined that travel along the segment cannot occur. For example, a canine unit (K9) may be needed at the target but the accompanying officer is not. However, the officer is needed to open a door along the segment so the dog can get through. Even though the officer is not needed at the target, he is needed for the dog to get to the destination. Therefore, should the officer not be able to get to this point, the dog cannot go further. After traversal of each segment, the Boolean flag(s) for the array's element(s) representing such capability(s) that are no longer present/valid/active are marked invalid 409.

If all of the requirements of the event would still be met if the segment is followed, the path traversal time is updated by adding the time to traverse the segment to the current path traversal time (412): TraversalTime=TraversalTime+the slowest element's (in the array ArrCap) SegmentTraversalTime. To determine the traversal time of the segment, the all of the different capabilities in the array are iterated through. For each capability, the speed per unit length across the segment is determined while considering the terrain type. Given capabilities traversal speed is impacted by terrain, and which capability can travel faster in a given segment may change. For example, a car on a road is usually faster than an officer on foot; however a car driving through a very narrow alley might be slower than the same officer on foot. Thus, the segment traversal time is the slowest of the capabilities times the length of the segment.

After updating the path traversal time (412), the next segment is selected as the current segment (414). As described above, the next segment is selected by incrementing the pointer in the list of segments. The process then returns to determining whether the current segment is null (404). When all of the segments are completed, as above, the path is determined to be valid at step 406, the total traversal time (TraversalTime) is set to be the current path time (pCurrPath.TraversalTime), and the results are returned to step 308 in FIG. 3 where they are used to compare to the best path time.

In one embodiment, each segment has two Boolean rules associated with it: the different capability permutations and matching segment time formulas. For example, the target needs a K9 unit and the path consists of: a road requiring a vehicle with an officer driving it and optionally supports a K9 unit, an open lot that supports officers and/or K9 units, and an alley which supports only K9 units. The rules associated with these limitations may look like:

$$\text{Road} = (\text{Car \&\& Officer \&\& } K9) \| (\text{Car \&\& Officer \&\& } /K9)$$

$$\text{Lot} = (\text{Officer \&\& } K9) \| (\text{Officer}) \| (K9)$$

$$\text{Alley} = K9$$

where && signifies a logical "and" and ∥ signifies a logical "or." Another set of rules, associated with traversal speed may look like:

$$\text{Road} = \text{Car's Time/Distance} * \text{Distance to Travel}$$

$$\text{Lot} = (\text{Officer \&\& } K9) * \text{Min}(\text{Officer Lot Time/Distance}, K9 \text{ Lot Time/Distance}) \| (\text{Officer} * \text{Officer Lot Time/Distance}) \| (K9 * K9 \text{ Lot Time/Distance})$$

$$\text{Alley} = K9 * K9 \text{ Alley Time/Distance}$$

Then the path results in the final equation:

$$\text{Alley}(K9) + \text{Lot}(K9) + \text{Road}(\text{Car \&\& Officer \&\& } K9)$$

And traversal time for the path would be:

$$(\text{Alley Distance} \times K9\text{'s Alley Time/Distance}) + (\text{Lot Distance} \times K9\text{'s Lot Time/Distance}) + (\text{Road Distance} \times \text{Road Time with Car \&\& Officer \&\& } K9/\text{Distance}).$$

When a source unit has multiple capabilities (such as personnel within a vehicle where as K9 units can also be in the vehicle) when determining the viability of a path, the segments may be traversed from the origin to the target or from the target to the origin. Each segment should at a minimum support all of the requirements of the event. If a particular segment does not have a capability that matches at least one of the requirements of the event, the segment and all paths employing the segment can be discarded 410. If a particular segment is limited by a distal segment in the path that is more distal from the target, the calculation of the time to traverse the path may exclude capabilities of the particular segment that are not included in the distal segment 409.

Figure 5:
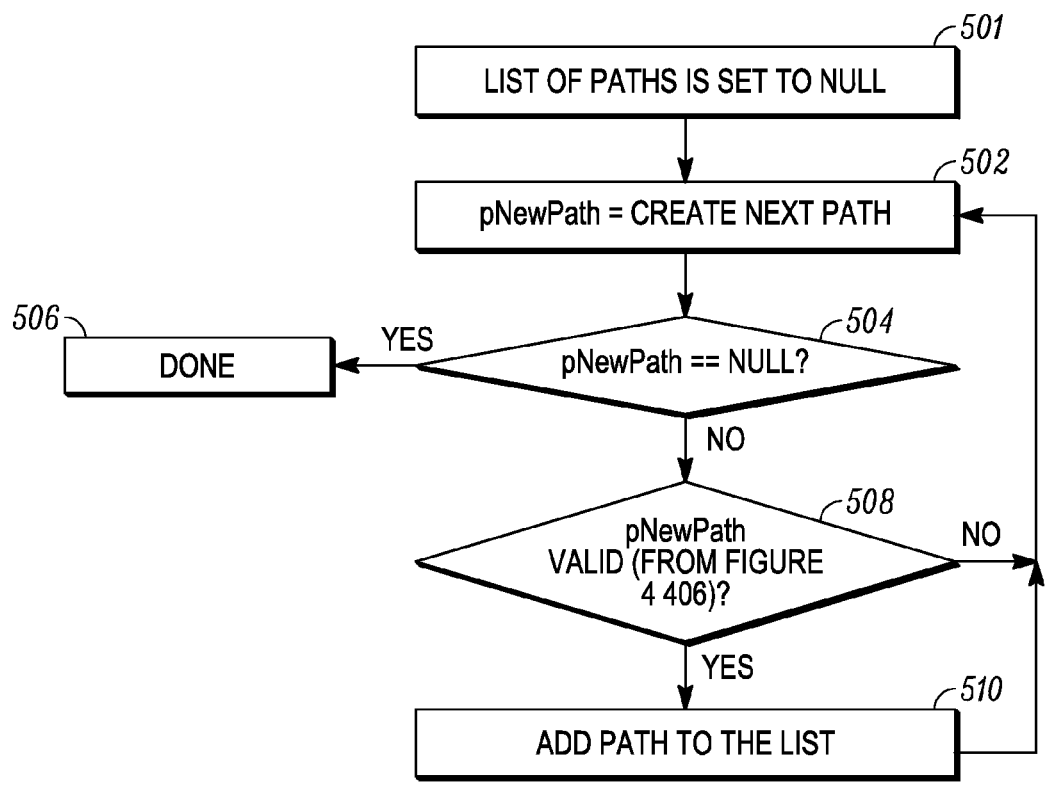
FIG. 5 is an embodiment of a flowchart for path creation.

One embodiment of a process of creating a list of paths is shown in the flowchart 500 of FIG. 5. As above, the flowchart 500 creates a linked list of paths (or array, hash table, etc.). After initialization 501 in which the list of paths is set to null, a first path, if one can be created, is created 502. Paths may be created using any known path creation algorithm (e.g., shortest physical route, most highway). The paths created are bounded by distance to limit the number of paths to analyze.

Each segment of the path, whether the path has one segment or multiple segments, has capability information that is provided by a geofile, as above. If a path has multiple segments, the segments provided by the path creation tool are created dependent on the capacity change. For example, if multiple types of terrains are present, such as a street and an open lot, with the pathway in a straight line across both, then separate segments are used. If the path creation tool cannot create the individual segments this way, then additional processing may be used to split the segments up into smaller segments as the capabilities across the segment changes. To do so, the path is overlaid onto the geofile, and wherever the terrain type changes, the segment is split until the full segment is traversed. After adding the first path to the list of possible paths (510), the process returns to step 502 and the process again attempts to create a new path. Once it is determined that all possible paths have been created (504) and the valid paths placed in the list, the process terminates (506).

Figure 6:
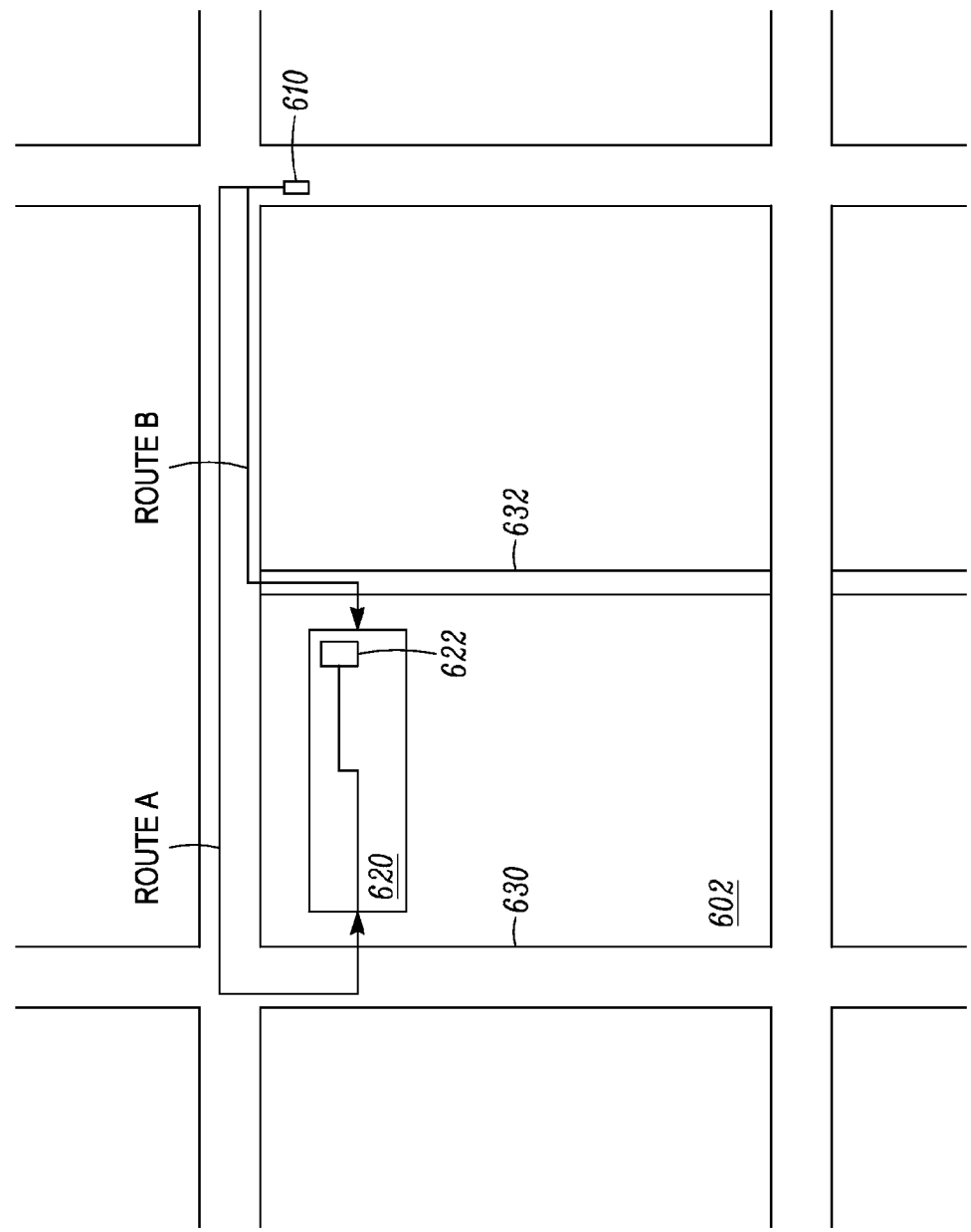
FIG. 6 illustrates an embodiment of various routes to a target.

Turning now to examples of the use of the above optimizations: one simple example of a map in which various pieces of information may be combined to optimize response is shown in FIG. 6. In the urban layout 600 shown, an ambulance 610 is called to a room 622 in a building 620 on a block 602. Although Route A is the shortest distance using the streets 630, an alley 632 abuts the building 620. The building 620 is accessible by the ambulance via the alley 632. Thus, Route B is actually the shortest distance. In addition, as shown in FIG. 6, the room 622 is at the back of the building 620, close to the alley 632. This further increases disparity between Routes A and B to the ultimate destination, the room 622. The multiple sources of information are accessible by, e.g., a 911 dispatcher taking the call from the room 622 or are sent to the personnel in the ambulance 610. These sources are analyzed automatically by a computer to determine the best route, Route B, or may be analyzed by the dispatcher or the personnel. The information may include, for example, the phone number of the front desk or manager of the building 620 so that the person responsible for the building 620 can be called to make sure that the building 620 is accessible via the alley 632 (e.g., by opening a locked door to the alley 632). As above, once analyzed, the information may be presented graphically using a display to the dispatcher and/or the ambulance personnel. Thus, by accessing and using multiple sources of information that are contained in one or more databases but coordinated on one display, the dispatcher or personnel in the ambulance can determine the most effective route to the destination.

Figure 7:
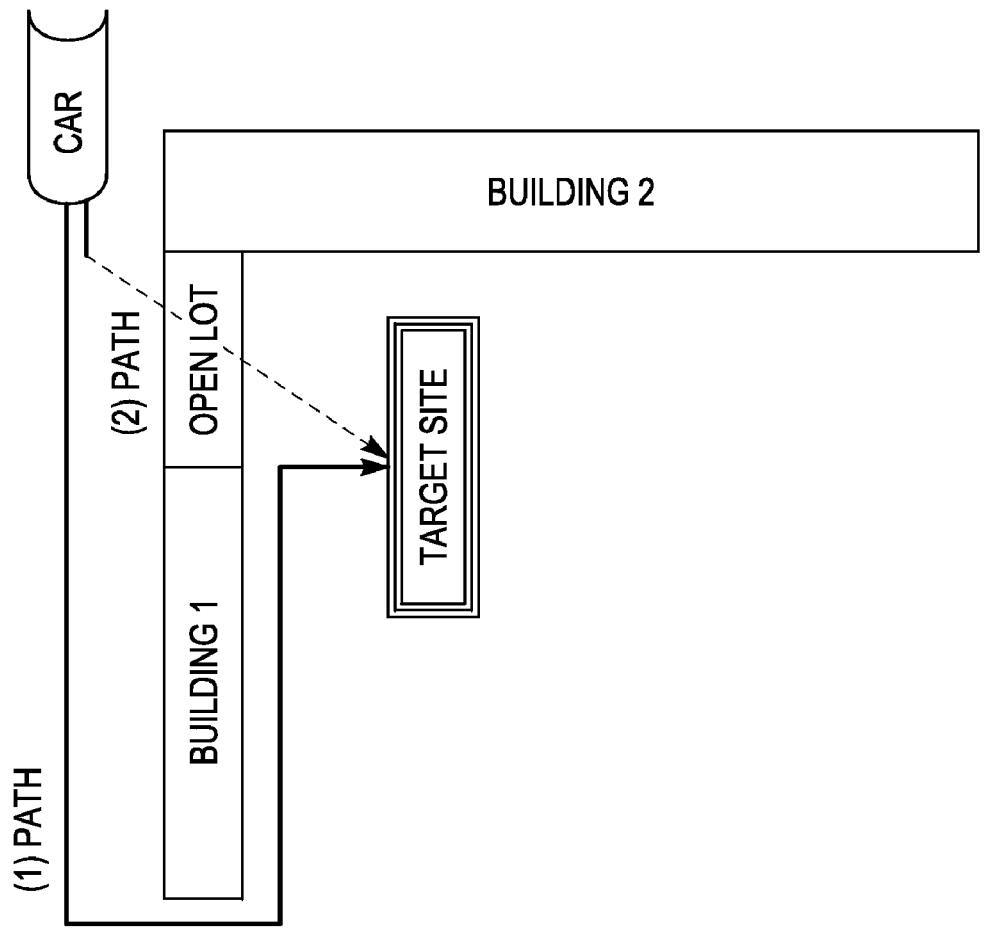
FIG. 7 illustrates an embodiment of various routes to a target.

Another example of making use of the various information sources is shown in FIG. 7. In this figure, a police patrol car is called to a target site. The car drives all the way around building 1 to get to the target site using path 1 (solid line). Path 1 (dashed line), however, may be a more direct route to the target site. The car may be directed to drive through the lot or, if the car is unable to be driven through the lot, the car may be directed to stop adjacent to the open lot and the officer(s) directed to run through the lot to the target site. Further information may be used to decide between paths 1 and 2, however. This additional information may include is the lot open (i.e., are there fences surrounding it) and if so, what is the condition of the lot (e.g., clear cut, paved, construction equipment present, contaminated). Thus, even if path 1 is shorter, it may not be the fastest route. This information is correlated and the fastest route either automatically determined using a computer or provided in a logical series of maps and/or information to the officers in the car or a dispatcher for evaluation. Note that in this example, as in others discussed herein, if multiple personnel are in a vehicle, they can be split up to take different paths if desired.

Figure 8:
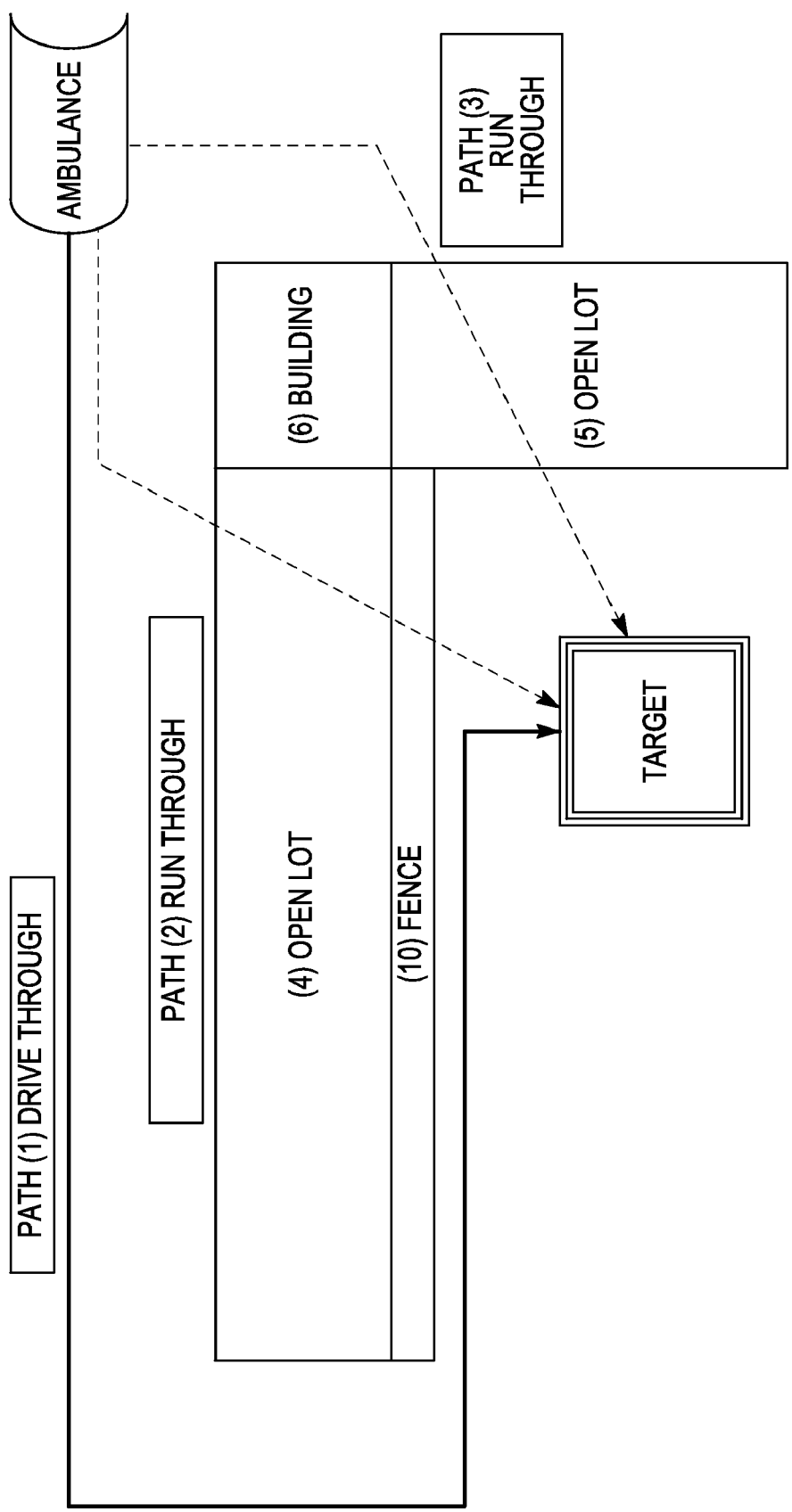
FIG. 8 illustrates an embodiment of various routes to a target.

Another example is shown in FIG. 8. In this example, an ambulance is being directed to a target site. A building 6 stands in the direct path of the ambulance and open lots 4 and 5 form an "L" with the building 6. As shown in FIG. 8, there are multiple paths around the building 6 to get to the target site: path 1 is a vehicular path taking roads to reach the target site and paths 2 and 3 are vehicular/pedestrian paths over open lots 4 and 5 to reach the target site. Paths 2 and 3 have multiple segments, a vehicular segment (shown by the horizontal and vertical dashed lines) and a pedestrian segment (shown by the diagonal dashed lines). To determine the best path out of the multiple available paths, multiple sources of information for each segment of each path are considered. This information includes, for example, the distance of each of paths 1, 2, and 3, the traffic conditions along the road portions of each of paths 1, 2, and 3, the access to and condition of each of the lots 4, 5, the amount and type of equipment to carry to the target site, how much equipment the personnel in the ambulance can carry, etc. In this example, a fence 10 prevents the final traversal across open lot 4, making this segment of this path invalid, and hence the path invalid.

Figure 9:
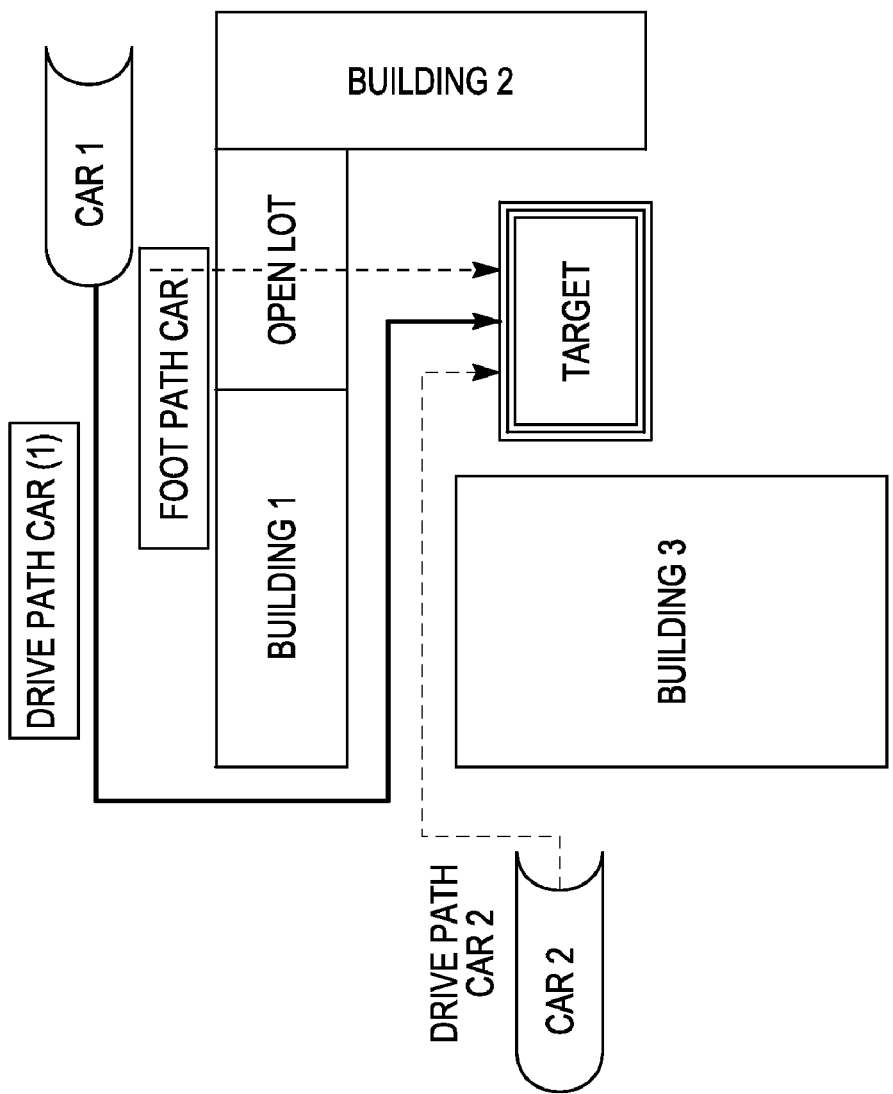
FIG. 9 illustrates an embodiment of various routes to a target.

FIG. 9 illustrates an example similar to that of FIG. 7, with multiple units able to respond, but only one unit actually to respond. In this example, multiple police patrol cars that meet the capabilities required of the task are available to be called to a target site. The first unit (car 1) has two routes available: the vehicular path (drive path car 1 shown by the solid line) in which the first unit drives all the way around building 1 to get to the target site, and the pedestrian path (foot path car 2 shown by the dashed line) through the open lot between buildings 1 and 2. The second unit (car 2) has a single route (drive path car 2 shown by the dotted line). These paths are each considered and evaluated for response time using information and criteria similar to that described above. The path that results in the fastest response time is determined and the respective unit is selected. Once the unit is selected, the route information is transmitted to the selected unit.

Figure 10:
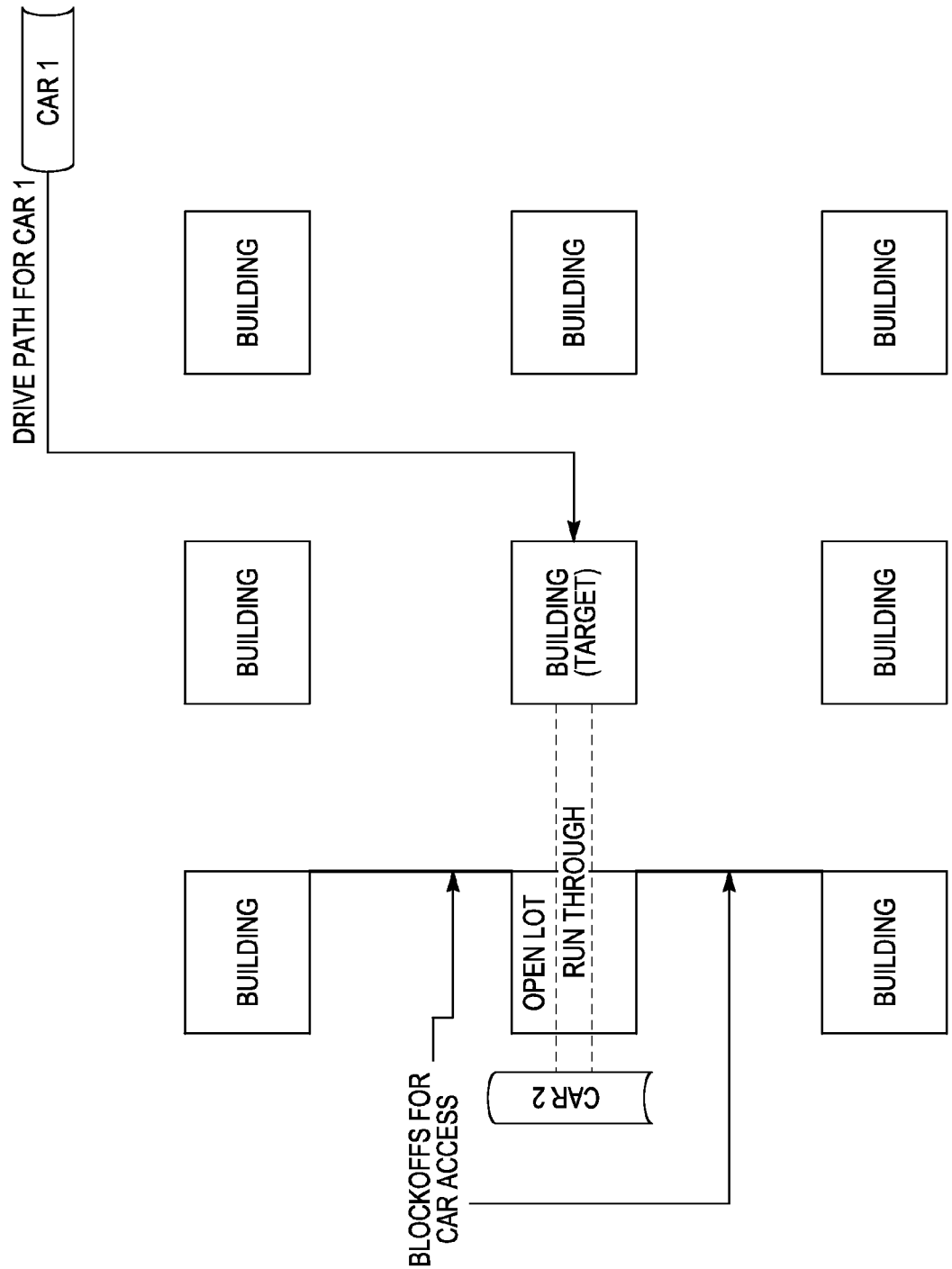
FIG. 10 is an embodiment of optimizing various routes to a target.

Not all optimized routes, however, have the shortest distance. An example in which the event requirements necessitate a longer route is shown in FIG. 10. In this example, several police cars are available to respond to a crime being committed. As illustrated, there are two cars Car1 and Car2 that can potentially be called to the crime. If only the officers are needed to respond to the call, the paths of Car1 and Car2 are analyzed. There are two paths: the car path of Car1 and the foot path of Car2. The paths are analyzed and it is determined that an open lot is present between Car2 and the target. However, it is also determined that because of blockoffs Car2 cannot cross the open lot; only if the open lot is traversed by foot can the officer reach the target. It is further determined that the shortest time is for Car1 to drive to the target and for an officer in Car2 to run through the open parking lot. It is also determined that the crime is being committed in the front of the building, where Car1 would end, rather than the back of the building, where Car2 would end. Even if the run through time for Car2 is longer than the drive time for Car1, it may be decided to have the officer from Car2 respond on foot through the open lot (perhaps saving the officers in Car1 for backup) to avoid the criminal from seeing the approach of Car1. This, in turn, would increase the likelihood of capture as long as predetermined time limitations are not exceeded by the officer from Car2 (e.g., it will take too long for the officer to reach the target by foot and the criminal will have left). In addition, as using the run through does not require sirens in the immediate vicinity of the criminal (from the unit responding using the run through), such an embodiment can minimize the likelihood of the criminals being made aware that they are about to be apprehended. Therefore, because the dispatcher may be automatically provided with a multiplicity of recommended police units, the dispatcher can make the determination of the best unit(s) to send based on this additional information.

Figure 11:
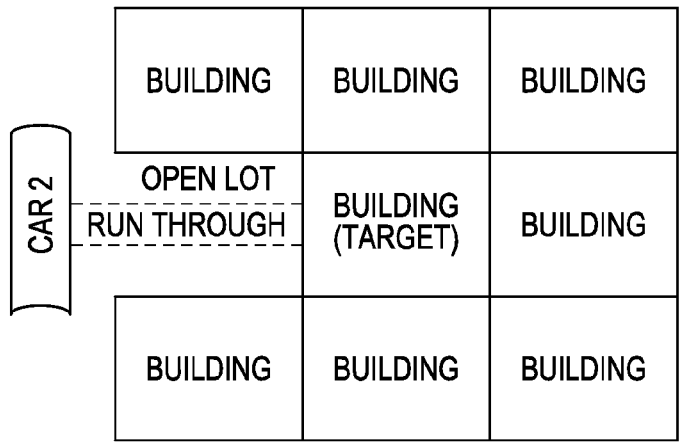
FIG. 11 is an embodiment of optimizing various routes to a likely escape route.

Another example of the use of the processes above is shown in FIG. 11. In this example, several police cars are available to respond to a crime being committed and it is desired to optimize officer placement using the likely escape route of the criminal at the target. Again, one or more police vehicles are called to the scene of a crime (target). In this case, however, various run throughs that are likely points of escape from the target area are quickly identified. After this identification, police vehicles may be placed in the path of the one or more most likely run throughs using the above processes to optimize the route to the run through rather than using the above processes to optimize the route to the target. This, in turn, may simplify capture of the criminal escaping from the target area when other units arrive. This is beneficial, especially to officers who may not be intimate with the target area.

Although a majority of the above description has focused on external paths, paths that are internal to buildings may be optimized. This information can be used to determine escape routes for the fastest way to reach or avoid dangerous situations (fire, bomb threats, etc.). The internal information of the building such as the positions of hallways, fire escapes, internal and external doors, elevators, and escalators, as well as telephone numbers of importance of the building, are available through various sources in the municipalities where the buildings are located. In the example shown in FIG. 6, navigations internal to the building may alter the decision of the optimal route depending on, e.g., location of the target room with relation to street access, equipment to take to the target room, location of corridors and utility paths, and size of internal path to the target room.

To optimize route information, information both internal and external to a particular target is collocated and routinely updated. The length of time for updates is dependent on the particular path. For example, data such as traffic information should be updated at relatively short intervals (e.g., minutes), information about the status of lots may be updated over longer intervals (e.g., days, weeks), and information about buildings may be updated over even longer intervals (e.g., months, years). In other embodiments, updating of building or lot information may occur only when changes happen—such as a particular lot being dug up to bury cables or to lay a foundation for a new building.

Figure 12:
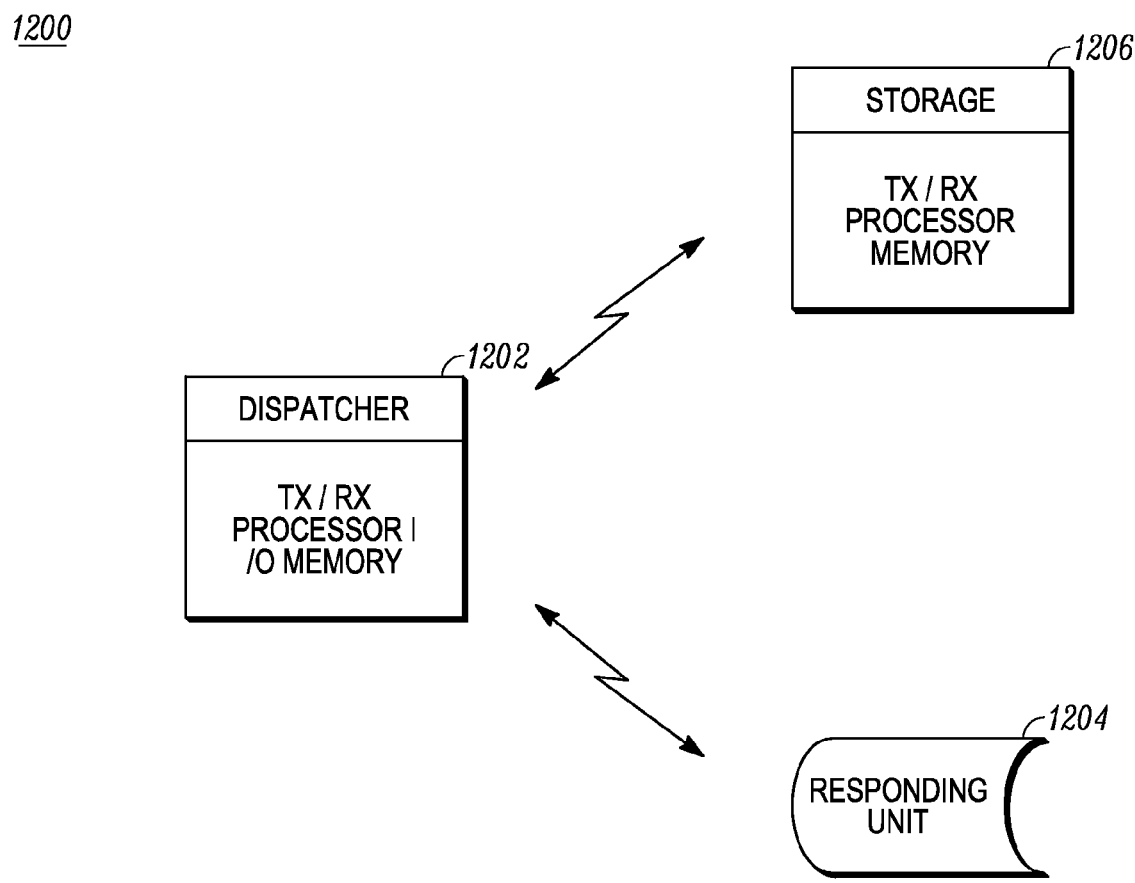
FIG. 12 illustrates an embodiment of a system employing the optimized route.

FIG. 12 illustrates an embodiment of a route-optimizing system. The system 1200 includes a dispatcher 1202, a responding unit 1204, and storage 1206. In this embodiment, the dispatcher 1202 receives a 911 call and determines the target using computers and other known equipment. The dispatcher 1202 then either queries various units in the vicinity to see what units are available for response or automatically determines which of these units are available. The location of the available units may be determined using GPS or other conventional location techniques. After the available units are determined the dispatcher 1202 decides the best unit and optimal route for that unit using the information in the storage 1206. For example, the dispatcher is provided with a list of best unit choices related to capabilities of each unit and other relative data. For example, if there are two units that can arrive within a small time difference, the dispatcher can determine what is best based on other data such as other dispatched incidents, etc.

The storage 1206 may be local (e.g., within the same building) or remote to the dispatcher 1202. The storage 1206 contains the information used to decide the best unit and optimal route and may itself make the decision, merely passing the information to the dispatcher 1202 via a wired or wireless connection for transmission to the responding unit 1204. Alternately, the storage 1206 may transmit the instructions to the responding unit 1204 directly. The storage 1206 may also contain computers and other equipment used to process the information and come to the decisions or recommendations. The dispatcher 1202 and/or storage 1206 may have dispatcher equipment and storage equipment, respectively, each of which comprise a processor, a transmitter and receiver, memory, I/O devices (e.g., keyboard, microphone, speaker, display), and other circuitry and elements, depending on the functionality at the location of the dispatcher 1202 and storage 1206. Note that FIG. 12 only shows an example of the circuitry and elements in each location and is not in any fashion to be taken as limiting.

In other embodiments, if multiple units are to respond the information may be used to automatically prioritize vehicles/personnel. Such a method would permit multiple routes to be used with overlapping or non-overlapping segments to enable efficient gathering of resources at the target. Thus, for example, several units respond at the target can have traveled at least a portion of the same route without interfering with each other. Thus, for example, if an accident is reported and an ambulance and police vehicle are to respond using the same portions of the optimal route at the same time, the ambulance may be given priority over the route and the police vehicle be directed over a different, longer, path.

Figure 13:
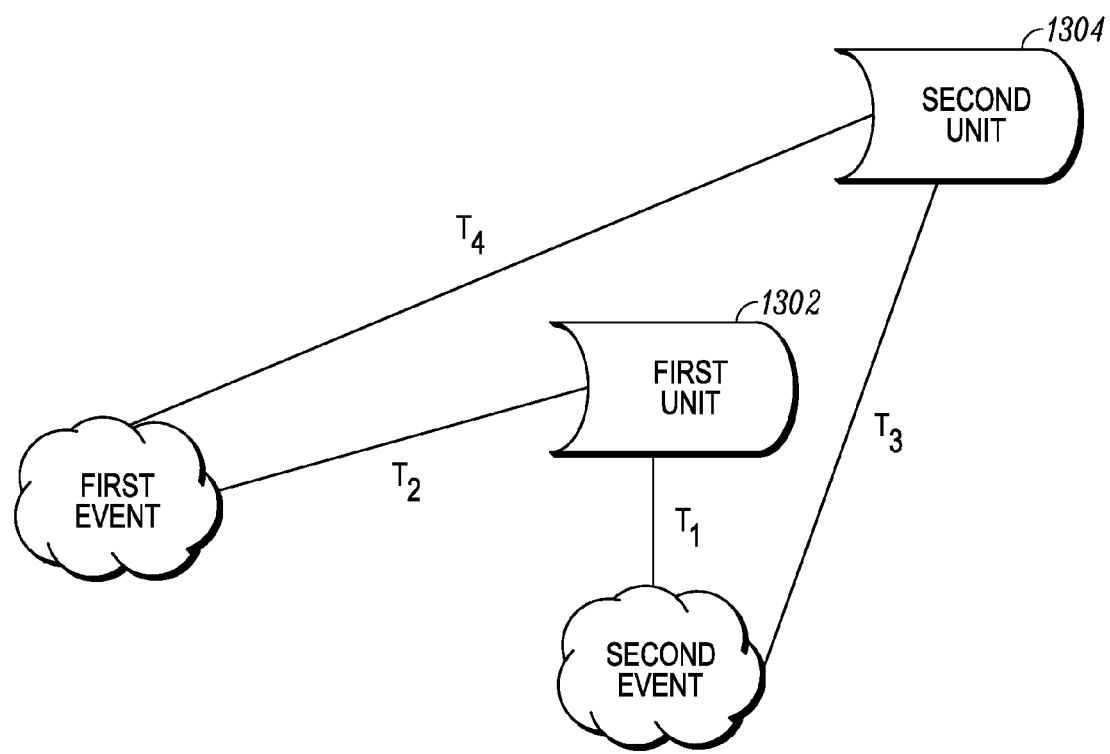
FIG. 13 is an embodiment of optimizing multiple routes to multiple targets.

Similarly, if first and second police vehicles can respond to two events at the same time and the first vehicles is optimal to more than one event, the system can either direct the first vehicle to the event closest to the first vehicle and the second vehicle to the other event or, after determining that the optimal times are sufficiently close, direct the vehicles to the events to best utilize the available resources. This last case may be beneficial especially if there is a great disparity between response times to the events for the units as shown in FIG. 13. As shown, although the first unit 1302 is optimal to respond to the first and second events (e.g., $T_1 < T_3$ and $T_2 < T_4$), the increase in the length of time caused by directing the second unit 1304 to the second event (i.e., it takes $T_1$ to respond to the first event and $T_4$ to respond to the second event) may make it more desirable to direct the first unit 1302 to the second event and the second unit 1304 to respond to the first event (i.e., it takes $T_2$ to respond to the first event and $T_3$ to respond to the second event).

In addition, if one police vehicle is determined to be the optimal unit to respond to multiple events at the same time, the event in which response of the police vehicle is prioritized as most important is determined and the police vehicle directed to that event using the optimal route to that event. In any of these embodiments, the system may retain a list of units for each event to respond to the event in order of priority for optimal response so that in such situations the next most optimal unit is called to respond to one of the events.

In summary, the response time to emergencies is paramount public safety. Reduction of response time can save lives and property. This, for example, improves the response time of emergency vehicles, personnel, equipment and other requirements (guns, K-9s, bomb-experts) to a target location, reduces the likelihood of alerting criminals of their imminent apprehension at the target location (as the run through does not require sirens in the immediate vicinity of the culprit), improves location of police vehicles in likely escape routes in anticipation of attempts of suspects to flee the target location, and improves identification of evacuation routes when emergencies occur (such as fires in a building).

The embodiments disclosed herein are implemented automatically using one or more electronic devices. The embodiments may be implemented in whole or in part using stationary devices, such as servers, and/or portable devices, such as laptops or hand-held devices. Each of these devices typically contains a processor, memory, and I/O devices such as a display, keyboard, mouse, etc. The devices also each contain computer-executable instructions, such as program modules including routines, programs, objects, components, segments, schemas, data structures, etc. that perform particular tasks or implement particular abstract data types. Although all of the functionality may be provided in a single device, in other embodiments, a distributed environment may be used in which the various tasks are performed by devices linked through one or more communications networks. In addition, a variety of computer-readable media may store some or all of the information and instructions. Computer-readable media includes volatile and nonvolatile, removable and non-removable media that is accessible to the computer. This media includes, for example, ROM, RAM, flash memory, EEPROM, CD, DVD, optical storage media, or magnetic storage media. The device is connected to other electronic devices using a wired or wireless (e.g., RF or IR) connection to a network. The networks connecting various devices include a local area network (LAN), wide area network (WAN), or the internet, for example, and have infrastructure components such as routers, base stations, and controllers.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

Those skilled in the art will recognize that a wide variety of modifications, alterations, and combinations can be made with respect to the above described embodiments without departing from the spirit and scope of the invention defined by the claims, and that such modifications, alterations, and combinations are to be viewed as being within the scope of the inventive concept. Thus, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by any claims issuing from this application and all equivalents of those issued claims.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of optimizing a responder's route to a target location, the method comprising:
   identifying, via dispatcher equipment, a plurality of available responding units to respond to an event at a first location;
   identifying, via the dispatcher equipment, capability requirements of the event;
   eliminating, via the dispatcher equipment, identified available responding units whose capabilities do not meet the capability requirements of the event;
   identifying, via the dispatcher equipment, a target location associated with the first location;
   identifying, via the dispatcher equipment, a second location associated with each remaining available responding unit;
   after the elimination:
      selecting, via the dispatcher equipment, one of the remaining available responding units;
      analyzing, via the dispatcher equipment and storage equipment, paths between the second location and the target location to determine an optimal route for the selected responding unit to travel, the analysis dependent on both traditional roadway map data and non-traditional map data, the non-traditional map data including paths linking roadways in the traditional roadway map data with one another and/or paths linking roadways in the traditional roadway map data with the target location; and
      repeating the selection and analysis for each of the available responding units remaining;

selecting, via the dispatcher equipment, an optimal one of the available responding units dependent on the analyses; and conveying, via the dispatcher equipment, instructions to the selected optimal responding unit to follow the corresponding determined optimal route determined for the selected optimal responding unit.

2. The method of claim 1, wherein the selected optimal unit comprises a vehicle containing personnel capable of using pedestrian paths not accessible to the vehicle, the non-traditional map data includes pedestrian paths not accessible to the vehicle, and the corresponding determined optimal route includes at least one pedestrian path.

3. The method of claim 1, wherein the first location is located within a building, the non-traditional map data includes interior paths of the building, and the corresponding determined optimal route includes the interior paths of the building.

4. The method of claim 1, wherein the step of analyzing paths between the second location and the target location comprises determining, via the dispatcher equipment, whether at least one segment along a particular identified bath is unable to satisfy the capability requirements of the event and, if so, eliminating, via the dispatcher equipment, the particular identified path from consideration as the corresponding determined optimal route.

5. The method of claim 1, wherein the step of analyzing paths between the second location and the target location further comprises summing, via the dispatcher equipment, traversal times of each segment along a particular identified path, based at least in part on a terrain type of each segment along the particular path, and wherein the corresponding determined optimal route has a lowest summed traversal time among all summed traversal times of all analyzed paths.

6. The method of claim 1, wherein the step of analyzing paths between the second location and the target location further comprises determining, via the dispatcher equipment, an automotive vehicular travel times along at least one segment in a particular path and a pedestrian travel time along at least another segment in the particular path.

7. The method of claim 1, wherein the target location is the first location.

8. The method of claim 1, wherein the target location is an escape route proximate to the first location.

9. The method of claim 1, wherein the event is an emergency, the method further comprising a dispatcher receiving an emergency call, via the dispatcher equipment, concerning the event and responsively conveying the instructions, via the dispatcher equipment, to the selected optimal responding unit.

10. The method of claim 1, further comprising, when multiple responding units are to respond to the event, using the analysis to prioritize the multiple responding units.

11. The method of claim 1, wherein the analysis comprises taking into account real-time traffic situations.

12. The method of claim 1, wherein the step of analyzing paths between the second location and the target location comprises taking into account capability requirements of the event and the capabilities of each remaining available responding unit.

13. A route-optimizing system comprising dispatcher equipment and storage equipment, the dispatcher and storage equipment in communication and a processor in at least one of the dispatcher or storage equipment that is configured to:

identify a plurality of available responding units to respond to an event at a first location, identify, via the dispatcher equipment, capability requirements of the event;

eliminate identified available responding units whose capabilities do not meet the capability requirements of the event, identify a target location associated with the first location;

identify a second location associated with each remaining available responding unit;

after the elimination:
  selects one of the remaining available responding units,
  analyze paths between the second location and the target location to determine an optimal route for the selected responding unit to travel, the analysis dependent on both traditional roadway map data and non-traditional map data including paths linking roadways in the traditional roadway map data with one another and/or paths linking roadways in the traditional roadway map data with the target location, the traditional roadway map data and non-traditional map data being stored in the storage equipment; and
  repeat the selection and analysis for each of the available responding units remaining,
select an optimal one of the available responding units dependent on the analyses, and
convey instructions to the selected optimal responding unit to follow the corresponding determined optimal route determined for the selected optimal responding unit.

14. The system of claim 13, wherein the selected optimal unit comprises a vehicle containing personnel capable of using paths not accessible to the vehicle, the non-traditional map data includes pedestrian paths not accessible to the vehicle, and the corresponding determined optimal route includes at least one pedestrian path.

15. The system of claim 13, wherein the first location is within a building, the non-traditional ma data includes interior paths of the building, and the corresponding determined optimal route includes the interior paths of the building.

16. The system of claim 13, wherein the processor is further configured to, while analyzing paths between the second location and the target location, to determine whether at least one segment along a particular identified path is unable to satisfy the capability requirements of the event and, if so, to eliminate the particular identified path from consideration as the corresponding determined optimal route.

17. The system of claim 13, wherein the processor is further configured to, while analyzing paths between the second location and the target location, to determine an automotive vehicular travel time along at least one segment in a particular path and a pedestrian travel time along at least another segment in the particular path, taking into account real-time traffic situations.

18. The system of claim 13, wherein the processor is further configured to, while analyzing paths between the second location and the target location, take taking into account the capability requirements of the event and the capabilities of each remaining available responding unit.

19. The system of claim 13, wherein when multiple responding units are to respond to the event, the processor is further configured to use the analysis to prioritize the multiple responding units.

20. The system of claim 13, wherein the processor is further configured to, when multiple responding units are to respond to the event, use the analysis to prioritize the multiple responding units.

* * * * *

UNITED STATES PATENT AND TRADEMARK OFFICE
CERTIFICATE OF CORRECTION

PATENT NO.        : 8,095,410 B2
APPLICATION NO.   : 12/338555
DATED             : January 10, 2012
INVENTOR(S)       : Bloom Page 1 of 1

It is certified that error appears in the above-identified patent and that said Letters Patent is hereby corrected as shown below:

In Fig. 3, Sheet 3 of 12, for Tag "302", in Line 3, delete "TRAVERAL" and insert -- TRAVERSAL --, therefor.

In Column 16, Line 10, in Claim 13, delete "selects" and insert -- select --, therefor.

In Column 16, Line 35, in Claim 15, delete "ma" and insert -- map --, therefor.

In Column 16, Line 54, in Claim 18, delete "take taking" and insert -- taking --, therefor.

Signed and Sealed this
Eighteenth Day of December, 2012

David J. Kappos
*Director of the United States Patent and Trademark Office*